US012362609B2

(12) United States Patent
Tachibana et al.

(10) Patent No.: US 12,362,609 B2
(45) Date of Patent: Jul. 15, 2025

(54) MOTOR WITH AN AIR-CORE COIL AND BACK YOKE TO REDUCE EDDY CURRENT LOSSES

(71) Applicant: Nidec Corporation, Kyoto (JP)

(72) Inventors: Yu Tachibana, Kyoto (JP); Yoichi Sekii, Kyoto (JP); Hiroaki Hirano, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 406 days.

(21) Appl. No.: 17/679,421

(22) Filed: Feb. 24, 2022

(65) Prior Publication Data

US 2022/0278570 A1   Sep. 1, 2022

(30) Foreign Application Priority Data

Feb. 26, 2021 (JP) ................................. 2021-030895

(51) Int. Cl.
*H02K 1/27* (2022.01)
*H02K 1/18* (2006.01)
*H02K 3/28* (2006.01)
*H02K 5/173* (2006.01)

(52) U.S. Cl.
CPC ............. *H02K 1/27* (2013.01); *H02K 1/185* (2013.01); *H02K 3/28* (2013.01); *H02K 5/1732* (2013.01); *H02K 2213/03* (2013.01)

(58) Field of Classification Search
CPC ............ H02K 1/27; H02K 1/185; H02K 3/28; H02K 5/1732; H02K 2213/03; H02K 1/2726; H02K 1/278; H02K 21/145; H02K 2205/03; H02K 2207/03; H02K 7/083; H02K 1/2706; H02K 5/04; H02K 5/16; H02K 15/14

USPC ........................................................ 310/216
See application file for complete search history.

(56) References Cited

U.S. PATENT DOCUMENTS

| 6,215,209 | B1* | 4/2001 | Yamamoto | H02K 15/14 |
| | | | | 310/90 |
| 2002/0172438 | A1 | 11/2002 | Nakagawa et al. | |
| 2003/0234586 | A1 | 12/2003 | Iwase et al. | |
| 2012/0091852 | A1* | 4/2012 | Krauth | H02K 15/026 |
| | | | | 29/598 |
| 2012/0293035 | A1* | 11/2012 | Nakamura | H02K 21/14 |
| | | | | 310/208 |

FOREIGN PATENT DOCUMENTS

| JP | S50121205 U | 10/1975 |
| JP | H05207725 A | 8/1993 |

(Continued)

OTHER PUBLICATIONS

JP2002136034A English translation (Year: 2024).*

(Continued)

*Primary Examiner* — Christopher M Koehler
*Assistant Examiner* — Viswanathan Subramanian
(74) *Attorney, Agent, or Firm* — Keating & Bennett, LLP (57) ABSTRACT

A motor includes a rotor including a shaft centered on a central axis extending vertically, a bearing that supports the shaft, an air-core coil that is radially outward of the rotor and extends in an axial direction, and a back yoke that includes an axially extending shape with a linear portion having a coil shape, and includes an inner peripheral surface to which the air-core coil is fixed.

18 Claims, 7 Drawing Sheets

(56) References Cited

FOREIGN PATENT DOCUMENTS

| | | | | |
|---|---|---|---|---|
| JP | H05219665 | A | | 8/1993 |
| JP | H0823649 | A | | 1/1996 |
| JP | 2000166157 | A | * | 6/2000 |
| JP | 2002136034 | A | * | 5/2002 |
| JP | 2002339957 | A | | 11/2002 |
| JP | 2003189509 | A | | 7/2003 |
| JP | 2004032861 | A | | 1/2004 |
| JP | 2004166483 | A | | 6/2004 |
| JP | 2005-143236 | A | | 6/2005 |
| JP | 2012010572 | A | | 1/2012 |
| JP | 2016192867 | A | * | 11/2016 |
| JP | 2018166399 | A | | 10/2018 |

OTHER PUBLICATIONS

JP2005143236A English translation (Year: 2024).*
JP2000166157A English translation (Year: 2024).*
JP2016192867A English translation (Year: 2024).*
JP2012010572A English translation (Year: 2025).*
JPH05207725A English translation (Year: 2025).*

* cited by examiner

MOTOR WITH AN AIR-CORE COIL AND BACK YOKE TO REDUCE EDDY CURRENT LOSSES

CROSS-REFERENCE TO RELATED APPLICATIONS

The present application claims priority under 35 U.S.C. § 119 to Japanese Patent Application No. 2021-030895, filed on Feb. 26, 2021, the entire contents of which are hereby incorporated herein by reference.

1. FIELD OF THE INVENTION

The present disclosure relates to a motor.

2. BACKGROUND

Conventionally, there is known a DC brushless motor capable of reducing a loss caused by an eddy current, suppressing heat generation, and achieving downsizing. The motor schematically includes a stator-side field coil that supplies a current from the outside through a lead wire to generate a rotating magnetic field, an inner rotor that rotates based on the rotating magnetic field, a housing case that houses these members, and the like. Insulating layers (or insulators) are arranged between the housing case and a flange and between the housing case and an end flange, respectively, so that the inner rotor rotates during driving, and mainly interrupts a main path of the eddy current generated by a magnetic flux of a magnet interlinking with a conductor.

In the conventional configuration, the torque of the motor tends to be insufficient as compared with a configuration in which a stator core having a tooth around which a coil is wound is arranged. Meanwhile, in a case where a motor having a stator core configured by laminating magnetic steel plates is downsized, an area for caulking the stator core is hardly secured, and there is a possibility that it becomes difficult to manage an axis of the stator core. If the management of the axis of the stator core is insufficient, it is difficult to manage a gap between an inner rotor and the stator core, and there is a possibility that the inner rotor is locked.

SUMMARY

A motor according to an example embodiment of the present disclosure includes a rotor including a shaft centered on a central axis extending vertically, a bearing that supports the shaft, an air-core coil that is radially outward of the rotor and extends in an axial direction, and a back yoke that includes an axially extending shape with a linear portion having a coil shape, and includes an inner peripheral surface to which the air-core coil is fixed.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the drawings. In the present description, a direction in which a central axis A of a motor 100 illustrated in FIGS. 1 and 2 extends is simply referred to as an "axial direction", "axial", or "axially". A radial direction and a circumferential direction about the central axis A of the motor 100 are simply referred to as a "radial direction", "radial", or "radially" and "circumferential direction", "circumferential", or "circumferentially", respectively. In the present description, the axial direction when the motor 100 is arranged in the direction illustrated in FIG. 2 is defined as the vertical direction. Note that a vertical direction is a name simply used for a description, and does not limit an actual positional relationship and a direction.

Figure 1:
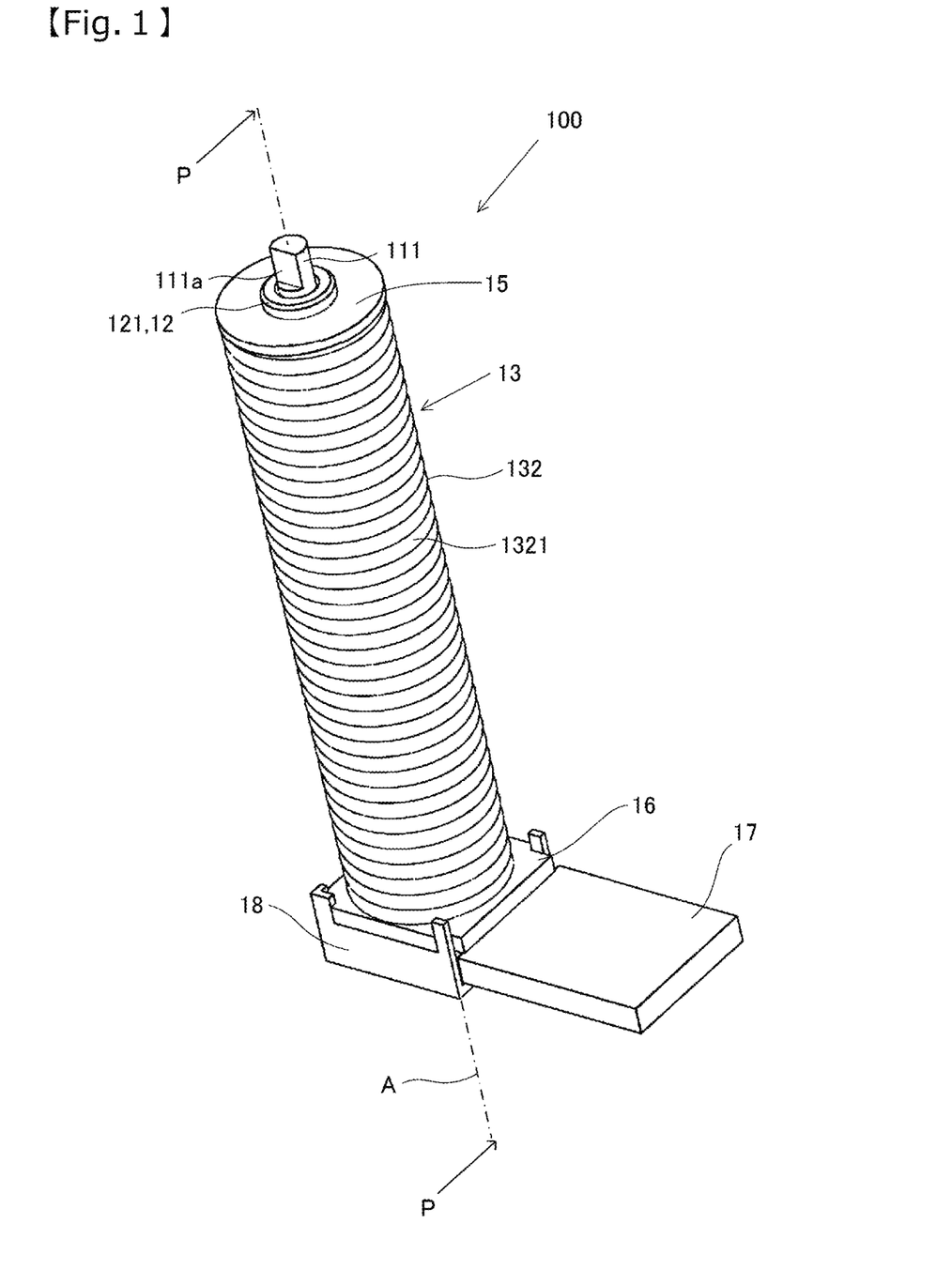
FIG. 1 is a schematic perspective view illustrating a configuration of a motor according to an example embodiment of the present disclosure.
Figure 2:
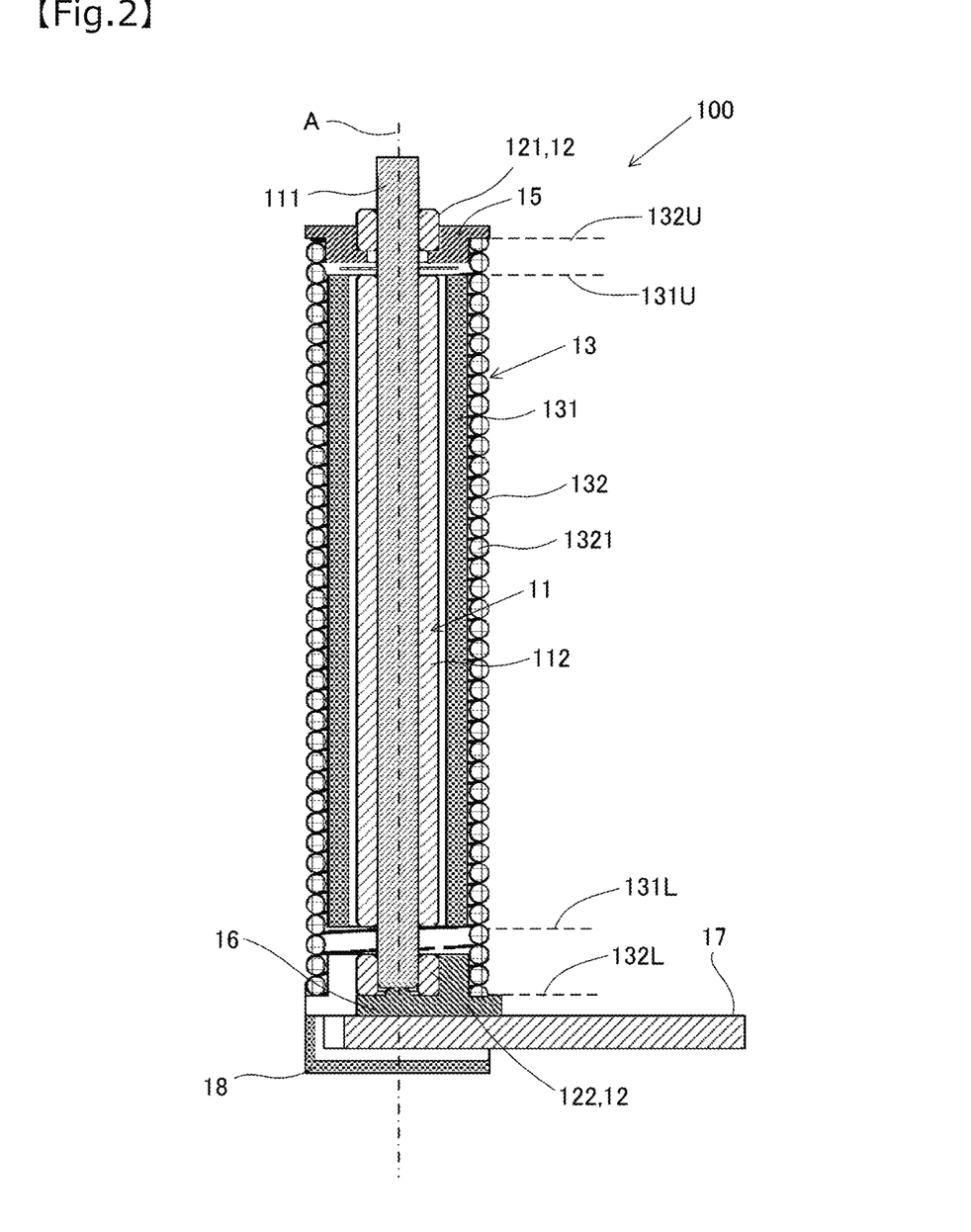
FIG. 2 is a longitudinal sectional view of the motor illustrated in FIG. 1 taken along a plane including a central axis.

FIG. 1 is a schematic perspective view illustrating a configuration of the motor 100 according to an example embodiment of the present disclosure. FIG. 2 is a longitudinal sectional view of the motor 100 illustrated in FIG. 1 taken along a plane including the central axis A. Specifically, FIG. 2 is a schematic sectional view taken along the plane orthogonal to a P direction illustrated in FIG. 1. As illustrated in FIGS. 1 and 2, the motor 100 includes a rotor 11 and a bearing 12. In addition, the motor 100 includes a stator 13.

The rotor 11 is provided so as to be rotatable about the central axis A. The rotor 11 has a shaft 111 centered on the central axis A extending vertically. The shaft 111 has a columnar or cylindrical shape extending in the vertical direction. In the present example embodiment, the shaft 111 has a columnar shape. The shaft 111 is made of metal, for example. In the motor 100 of the present example embodiment, a gear (not illustrated) is attached to an upper end portion of the shaft 111. The gear is included in, for example, a speed reducer. The motor 100 is a so-called geared motor.

In the present example embodiment, the shaft 111 has a shaft cutout portion 111*a* extending in the axial direction at the upper end portion. Since the shaft cutout portion 111a is provided, the upper end portion of the shaft 111 has a D shape in plan view from the axial direction. Since the shaft cutout portion 111a is provided, the gear attached to the upper end portion of the shaft 111 can be made difficult to rotate with respect to the shaft 111. However, the shaft cutout portion 111a is not necessarily provided. In such a case, for example, the rotation of the gear with respect to the shaft 111 may be suppressed by press-fitting the gear into the shaft 111.

The rotor 11 further includes a magnet 112. The magnet 112 is arranged radially outward of the shaft 111 and is fixed to the shaft 111. The magnet 112 is a field permanent magnet, and may be, for example, a sintered magnet, a bond magnet, or the like. Specifically, the magnet 112 has a cylindrical shape extending in the axial direction. In the present example embodiment, the magnet 112 has a cylindrical shape centered on the central axis A. For example, the shaft 111 is inserted into the magnet 112, and the magnet 112 is fixed to the inserted shaft 111 using an adhesive.

Since the rotor 11 is configured using the shaft 111 and the magnet 112 as in the present example embodiment, a material of the magnet 112 can be selected according to characteristics, and a range of adjusting the performance of the motor 100 can be widened. In addition, the magnet 112 can be enlarged in the radial direction, and thus, the magnetic flux density can be improved.

The bearing 12 supports the shaft 111. Specifically, the bearing 12 rotatably supports the shaft 111. In the present example embodiment, the bearing 12 includes an upper bearing 121 and a lower bearing 122. The upper bearing 121 is arranged radially outward of the shaft 111 and supports an upper portion of the shaft 111. The lower bearing 122 is arranged radially outward of the shaft 111 and supports a lower portion of the shaft 111.

The upper bearing 121 and the lower bearing 122 are cylindrical. Inner peripheral surfaces of the upper bearing 121 and the lower bearing 122 face an outer peripheral surface of the shaft 111 in the radial direction. The upper bearing 121 and the lower bearing 122 may be, for example, sleeve bearings or ball bearings. In the present example embodiment, the upper bearing 121 and the lower bearing 122 are sleeve bearings. Grease may be arranged between each of the bearings 121 and 122 and the shaft 111 in the radial direction. The sleeve bearing may be made of, for example, a metal sintered body or resin such as polyacetal.

The stator 13 is an armature of the motor 100. The stator 13 faces the rotor 11 in the radial direction and surrounds the rotor 11. That is, the motor 100 is an inner rotor motor. The stator 13 includes an air-core coil 131 and a back yoke 132. That is, the motor 100 includes the air-core coil 131 and the back yoke 132.

The air-core coil 131 is arranged at an interval radially outward of the rotor 11 and extends in the axial direction. Specifically, the air-core coil 131 has a cylindrical shape centered on the central axis A. The air-core coil 131 is arranged radially outward of the magnet 112 and faces the magnet 112 at an interval in the radial direction. The air-core coil 131 is a field coil. When a drive current is supplied to the air-core coil 131, circumferential torque is generated in the rotor 11, and the rotor 11 rotates about the central axis A.

The back yoke 132 is arranged radially outward of the air-core coil 131. The back yoke 132 has a configuration suitable for downsizing the motor 100. Details of the back yoke 132 will be described later.

As illustrated in FIG. 2, in the present example embodiment, as a preferable mode, an upper end 131U and a lower end 131L of the air-core coil 131 are arranged between an upper end 132U and a lower end 132L of the back yoke 132 in the axial direction. According to such a configuration, a magnetic flux generated by causing the drive current to flow through the air-core coil 131 can be efficiently passed through the back yoke 132, and magnetic characteristics of the motor 100 can be improved.

As illustrated in FIGS. 1 and 2, the back yoke 132 has a shape extending in the axial direction with a linear portion 1321 formed in a coil shape. The linear portion 1321 is mainly made of a metal wire. The metal wire is preferably made of a soft magnetic material, and may be made of, for example, pure iron or electromagnetic stainless steel. The material of the metal wire forming the back yoke 132 may be other than pure iron or electromagnetic stainless steel.

In the present example embodiment, the back yoke 132 has a circular shape centered on the central axis A in plan view from the axial direction. Preferably, the coil-shaped back yoke 132 is compressed in the axial direction with the linear portions 1321 in contact with each other in the axial direction. That is, the back yoke 132 preferably has a cylindrical shape. The back yoke 132 has an inner peripheral surface to which the air-core coil 131 is fixed. For example, the air-core coil 131 is fixed to the back yoke 132 using an adhesive.

Since the back yoke 132 has the coil shape, the number of parts can be reduced as compared with a case where the stator 13 is formed by laminating magnetic steel plates, and the stator 13 can be easily assembled even when the motor 100 is downsized. In addition, with the configuration in which the stator 13 includes the coil-shaped back yoke 132, it is possible to reduce an eddy current that hinders the rotation of the rotor 11 similarly to the case of forming a laminated core by laminating the magnetic steel plates. In addition, it is possible to suppress an increase in cost and optimize the performance of the motor 100 by selecting a type and a dimension of the linear portion 1321 constituting the back yoke 132.

Figure 3:
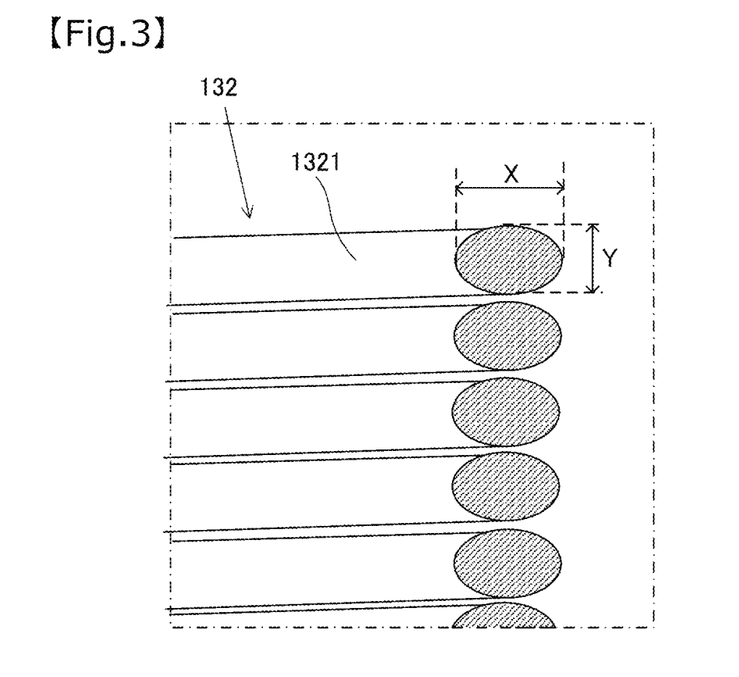
FIG. 3 is a schematic view describing a configuration of a back yoke according to an example embodiment of the present disclosure.

FIG. 3 is a schematic view for describing the configuration of the back yoke 132. FIG. 3 is a view in which a part of the back yoke 132 is cut out. A hatched portion in FIG. 3 is a cross section of the linear portion 1321. As illustrated in FIG. 3, as a preferable mode, a radial dimension X of the linear portion 1321 is the same as or larger than an axial dimension Y of the linear portion 1321. With such a configuration, it is possible to increase the magnetic flux density while reducing the eddy current similarly to the laminated core configured by laminating the thin magnetic steel plates.

Note that the radial dimension X of the linear portion 1321 is more preferably larger than the axial dimension Y of the linear portion 1321. As a result, it is possible to enhance the effect of improving the magnetic flux density of the magnetic flux generated by causing the drive current to flow through the air-core coil 131.

In addition, as illustrated in FIG. 3, the cross section of the linear portion 1321 is elliptical in the present example embodiment, but may have another shape. The cross section of the linear portion 1321 is not limited to an ellipse or a circle, and may be, for example, a square or a rectangular. When the cross section of the linear portion 1321 is a square or a rectangular, the axial arrangement can be stabilized in a case where the linear portion 1321 formed in the coil shape is compressed in the axial direction, and the assemblability can be improved.

Figure 4:
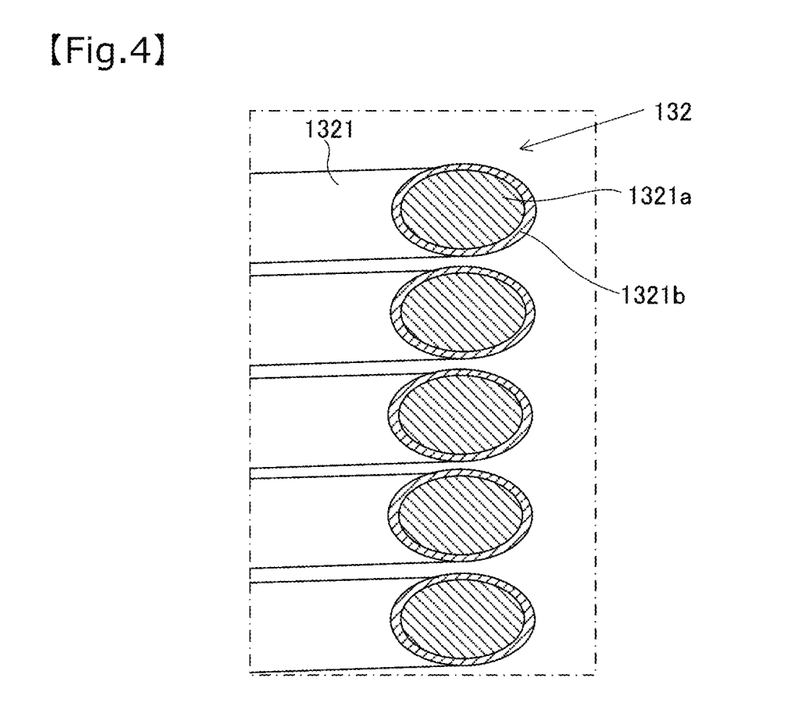
FIG. 4 is a schematic view describing a detailed configuration of the back yoke.

FIG. 4 is a schematic view for describing a detailed configuration of the back yoke 132. Similarly to FIG. 3, FIG. 4 is a view in which a part of the back yoke 132 is cut out, and a hatched portion is a cross section of the linear portion 1321. As illustrated in FIG. 4, as a preferable mode, the linear portion 1321 has an insulating film layer 1321b on the surface. Specifically, the linear portion 1321 includes a metal wire 1321a and the insulating film layer 1321b. The insulating film layer 1321b covers at least a part of the surface of the metal wire 1321a.

With the configuration in which the insulating film layer 1321b is provided on the surface, insulation can be easily secured even when the linear portions 1321 forming the coil-shaped back yoke 132 come into contact with each other. For this reason, the coil-shaped linear portion 1321 is easily compressed in the axial direction, and the magnetic characteristics of the motor 100 can be enhanced by increasing a region off the back yoke 132 through which the magnetic flux can pass.

The insulating film layer 1321b is made of, for example, an insulating resin. The insulating film layer 1321b can be formed, for example, by electrodeposition coating of the insulating resin such as an epoxy resin on the metal wire 1321a. The back yoke 132 can be formed, for example, by performing electrodeposition coating of an epoxy resin on the metal wire 1321a formed in a coil shape, and compressing and baking the coil-shaped metal wire 1321a which has been subjected to electrodeposition coating. For example, the back yoke 132 may be formed by applying an adhesive to the metal wire 1321a formed in a coil shape and compressing and solidifying the coil-shaped metal wire 1321a to which the adhesive has been applied.

Note that the insulating film layer 1321b configured to cover the surface of the metal wire 1321a with a separate member is not essential. The radial and axial dimensions X and Y of the linear portion 1321 illustrated in FIG. 3 may be dimensions including the insulating film layer 1321b configured as the separate member from the metal wire 1321a or dimensions not including the insulating film layer 1321b.

An axial dimension of the metal wire 1321a constituting the linear portion 1321 is, for example, 0.1 mm or more. For example, an axial dimension of one magnetic steel plate constituting the laminated core is 0.2 mm or more. For this reason, when the back yoke 132 is configured using the linear portion 1321, it is possible to reduce the eddy current equivalently to or more than the laminated core.

Figure 5:
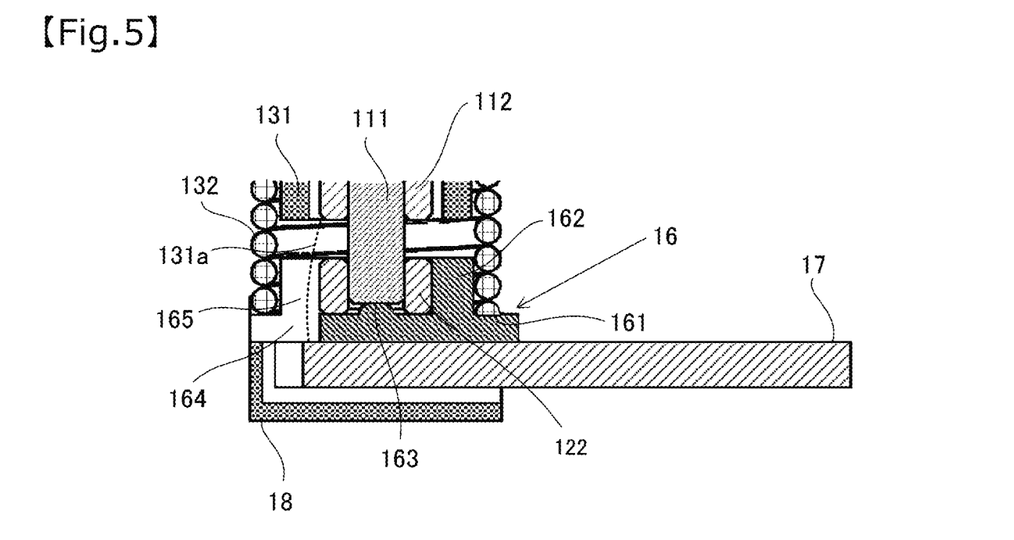
FIG. 5 is a schematic sectional view illustrating, in an enlarged manner, a lower bush according to an example embodiment of the present disclosure and a periphery thereof.
Figure 6:
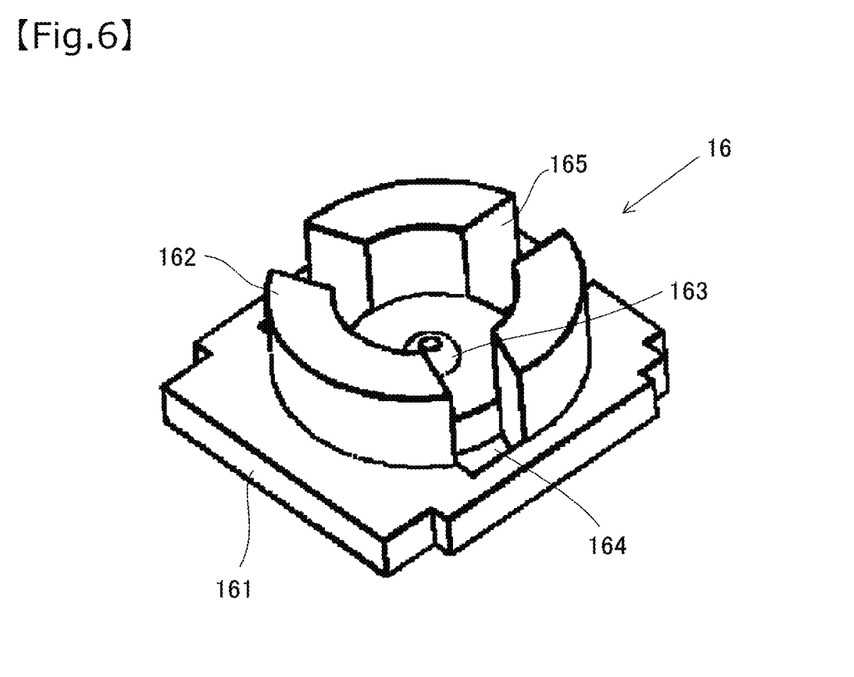
FIG. 6 is a schematic perspective view illustrating a configuration of the lower bush.

As illustrated in FIG. 2, the motor 100 further includes a lower bush 16 that holds the lower bearing 122. The lower bush 16 is made of, for example, metal or resin. FIG. 5 is a schematic sectional view illustrating the lower bush 16 and a periphery thereof in an enlarged manner. FIG. 5 is an enlarged view of the lower side of FIG. 2. FIG. 6 is a schematic perspective view illustrating a configuration of the lower bush 16.

As illustrated in FIGS. 5 and 6, the lower bush 16 includes a bush bottom plate portion 161, a bush cylindrical portion 162, and a bush protruding portion 163.

The bush bottom plate portion 161 expands in a direction orthogonal to the axial direction. In the present example embodiment, the bush bottom plate portion 161 has a rectangular plate shape having cutouts at four corners in plan view from the axial direction. The bush cylindrical portion 162 extends upward from the bush bottom plate portion 161 and holds the lower bearing 122 arranged radially inward. In the present example embodiment, the bush cylindrical portion 162 has a cylindrical shape centered on the central axis A. The lower bearing 122 is fitted into the bush cylindrical portion 162. An inner peripheral surface of the bush cylindrical portion 162 faces an outer peripheral surface of the lower bearing 122 in the radial direction. The lower bearing 122 is fitted to a position where a lower surface thereof abuts against an upper surface of the bush bottom plate portion 161. The lower bearing 122 is fixed to the bush cylindrical portion 162 by press-fitting, press-fitting adhesion, or caulking, for example.

Note that the lower bush 16 is attached to the back yoke 132 by fitting the bush cylindrical portion 162 into the back yoke 132 from a lower portion of the back yoke 132. That is, an outer peripheral surface of the bush cylindrical portion 162 faces the inner peripheral surface of the back yoke 132 in the radial direction. The bush cylindrical portion 162 is fitted into the back yoke 132 to a position where the bush bottom plate portion 161 abuts against the lower end of the back yoke 132. The lower bush 16 is fixed to the back yoke 132 using, for example, an adhesive.

The bush protruding portion 163 protrudes upward from the bush bottom plate portion 161 and faces a lower end of the shaft 111 in the axial direction. Specifically, the bush protruding portion 163 is arranged at a position overlapping the center of the bush cylindrical portion 162 in plan view from the axial direction. That is, the bush protruding portion 163 is arranged at a position on the upper surface of the bush bottom plate portion 161 through which the central axis A passes. In the present example embodiment, the bush protruding portion 163 is surrounded by an inner peripheral surface of the lower bearing 122 fitted in the bush cylindrical portion 162. The bush protruding portion 163 axially faces the lower end of the shaft 111 fitted to the cylindrical lower bearing 122.

According to the lower bush 16 with such a configuration, the shaft 111 can be received by the bush protruding portion 163, an axial position of the shaft 111 can be stabilized. According to the lower bush 16 with such a configuration, a positional relationship between an axial magnetic center of the rotor 11 and the stator 13 can be stabilized. In the present example embodiment, as a preferable mode, the bush protruding portion 163 is in contact with the lower end of the shaft 111.

In the present example embodiment, as a preferable mode, a distal end of the bush protruding portion 163 is a spherical surface projecting upward. According to such a configuration, a contact area between the shaft 111 and the bush protruding portion 163 can be reduced, and wear of a member during the rotation of the shaft 111 can be suppressed. As a result, it is possible to reduce the possibility that the motor 100 is affected by foreign matter caused by the wear, for example. In addition, the life of the motor 100 can be extended.

As illustrated in FIGS. 5 and 6, the bush bottom plate portion 161 has at least one bush penetrating portion 164 penetrating in the axial direction. At least a part of the bush penetrating portion 164 is preferably arranged radially inward of the inner peripheral surface of the back yoke 132 in plan view from the axial direction. The bush penetrating portion 164 may be a penetration hole or a cutout. A lead wire 131a of the air-core coil 131 passes through the bush penetrating portion 164 and is connected to a circuit board 17 arranged below the lower bush 16. With such a configuration, the lead wire 131a of the air-core coil 131 can be easily routed to the circuit board 17.

Specifically, a plurality of the lead wires 131a are drawn out from the air-core coil 131. For example, the number of the lead wires 131a is four in a configuration in which a U phase, a V phase, and a W phase are star-connected, and the number of the lead wires 131a is three in a configuration in which the three phases are delta-connected. The number of the bush penetrating portions 164 may be the same as the number of the lead wires 131a. In this case, a plurality of the bush penetrating portions 164 are provided. However, all or some of the plurality of lead wires 131a may be bundled in the middle to form one lead wire. In such a configuration, the number of the bush penetrating portions 164 may be smaller than the number of lead wires 131a. When all of the plurality of lead wires 131a are bundled into one, the single bush penetrating portion 164 may be provided. Note that the number of the bush penetrating portions 164 is three in the present example embodiment.

The circuit board 17 is provided with, for example, a wiring pattern configured to supply an output current from an external driver (not illustrated) to the air-core coil 131 via the lead wire 131a. A distal end of the lead wire 131a is electrically connected to the circuit board 17 using, for example, solder. The circuit board 17 may be, for example, a rigid board, a flexible board (FPC), a rigid-flexible board, or the like. In the present example embodiment, the circuit board 17 is fixed to a lower surface of the lower bush 16. A method for fixing the circuit board 17 may be, for example, adhesion, screwing, caulking, or the like. In the present example embodiment, a circuit case 18 that covers the circuit board 17 from below is provided. However, the circuit case 18 is not necessarily provided.

In the present example embodiment, the bush cylindrical portion 162 has at least one bush cutout portion 165 extending from an upper end to a lower end in the axial direction. The number of the bush cutout portions 165 is the same as the number of the bush penetrating portions 164. In the present example embodiment, the number of the bush cutout portions 165 is three. Since the bush cutout portions 165 are provided, the bush cylindrical portion 162 is specifically constituted by a plurality of arcuate columnar bodies arranged at intervals in the circumferential direction.

The bush cutout portion 165 overlaps the bush penetrating portion 164 in the axial direction. As a result, the lead wire 131a of the air-core coil 131 can be easily routed to the circuit board 17 using the bush cutout portion 165 and the bush penetrating portion 164. In the present example embodiment, each of the plurality of bush cutout portions 165 overlaps the bush penetrating portion 164 in the axial direction.

Figure 7:
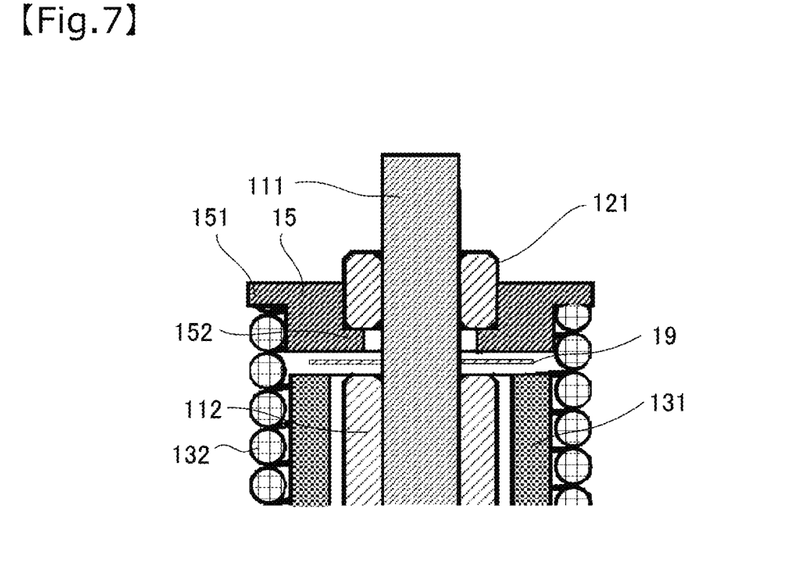
FIG. 7 is a schematic sectional view illustrating a configuration of an upper portion of the motor in an enlarged manner.

FIG. 7 is a schematic sectional view illustrating a configuration of an upper portion of the motor 100 in an enlarged manner. FIG. 7 is an enlarged view of the upper side of FIG. 2. As illustrated in FIGS. 2 and 7, the motor 100 further includes an upper bush 15 that holds the upper bearing 121. The upper bush 15 is made of, for example, metal or resin.

Specifically, the upper bush 15 has a cylindrical shape extending in the axial direction. In the present example embodiment, the upper bush 15 has a cylindrical shape centered on the central axis A. Specifically, the upper bush 15 has a bush flange portion 151, which has an annular shape and protrudes radially outward from an outer peripheral surface, in an upper end portion. In addition, the upper bush 15 has a bush inner annular portion 152, which has an annular shape and protrudes radially inward from an inner peripheral surface, in a lower end portion.

The upper bush 15 is fitted into the back yoke 132 from an upper portion of the back yoke 132. The upper bush 15 is fitted into the back yoke 132 to a position where the bush flange portion 151 abuts against the upper end of the back yoke 132. In addition, the upper bearing 121 is fitted into the upper bush 15 from an upper portion of the cylindrical upper bush 15. The upper bearing 121 is fitted to such a position as to abut against an upper end of the bush inner annular portion 152. The upper bearing 121 may be fixed to the upper bush 15 by, for example, press-fitting, press-fitting adhesion, or caulking.

In the present example embodiment, a part of the upper bearing 121 protrudes upward from the upper bush 15. With such a configuration, for example, the upper bearing 121 can be used for positioning of a gear box (not illustrated) and the like arranged in an upper portion of the motor 100. Note that the upper bush 15 does not necessarily have at least one of the bush flange portion 151 and the bush inner annular portion 152.

As illustrated in FIG. 7, the motor 100 further includes an annular portion 19 arranged radially outward of the shaft 111 and fixed to the shaft 111. In the present example embodiment, the annular portion 19 is a circular plate-like member centered on the central axis A. The annular portion 19 is made of, for example, metal. The annular portion 19 is fixed to the shaft 111 by press-fitting the shaft 111 therein, for example. The annular portion 19 protrudes radially outward from the outer peripheral surface of the shaft 111.

The annular portion 19 is arranged between the air-core coil 131 and the upper bearing 121 in the axial direction and overlaps the upper bearing 121 in the axial direction. With such a configuration, when the shaft 111 tries to be pulled out upward, the annular portion 19 acts as a stopper, so that the shaft 111 can be prevented from being pulled out upward.

In the present example embodiment, the annular portion 19 is arranged below the upper bush 15 whose lower end is located below a lower end of the upper bearing 121, and overlaps the upper bush 15 in the axial direction. For this reason, the annular portion 19 exerts a function as the stopper by coming into contact with the upper bush 15. However, there is a case where the annular portion 19 does not overlap the upper bush 15 in the axial direction, for example, in a circumstance where it is difficult to increase a radial size of the annular portion 19 or a structure in which it is difficult to provide the bush inner annular portion 152. Even in such a case, the annular portion 19 overlaps the upper bearing 121 in the axial direction, and thus, the annular portion 19 exerts the function as the stopper by coming into contact with the upper bearing 121.

Figure 8:
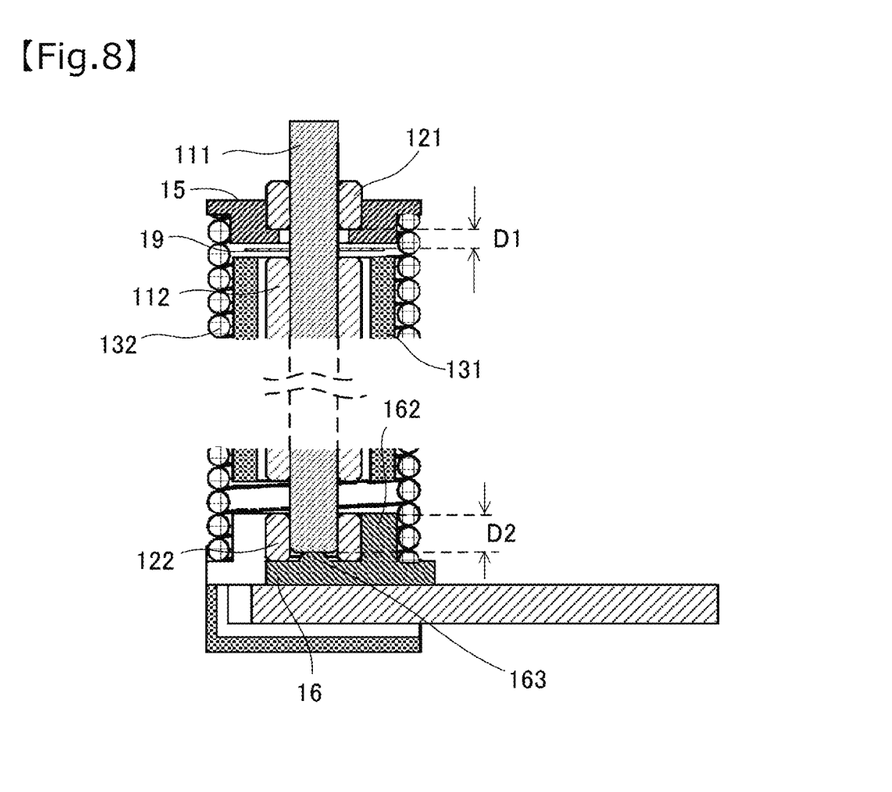
FIG. 8 is a schematic view describing a preferable structure of the motor.

FIG. 8 is a schematic view for describing a preferable structure of the motor 100. FIG. 8 is a view illustrating a part of the cross section illustrated in FIG. 2. Specifically, FIG. 8 illustrates the upper portion and the lower portion of the motor 100, and omits an intermediate portion of the motor 100. As illustrated in FIG. 8, as a preferable mode, an axial distance D1 between the upper bearing 121 and the annular portion 19 is smaller than an axial distance D2 between an upper end of the bush protruding portion 163 and an upper end of the lower bearing 122. With such a configuration, the annular portion 19 functions as the stopper, and the shaft 111 can be prevented from being pulled out of the lower bearing 122.

Note that the axial magnetic center of the rotor 11 may coincide with an axial magnetic center of the stator 13 including the back yoke 132 and the air-core coil 131. With such a configuration, the magnetic efficiency can be improved.

In the present example embodiment, however, the axial magnetic center of the rotor 11 is located axially above the axial magnetic center of the stator 13 including the back yoke 132 and the air-core coil 131. With such a configuration, when the motor 100 is driven, a force directed axially downward can be applied to the shaft 111, and the vertical movement of the shaft 111 can be suppressed. As a result, vibration and noise of the motor 100 can be suppressed.

Figure 9:
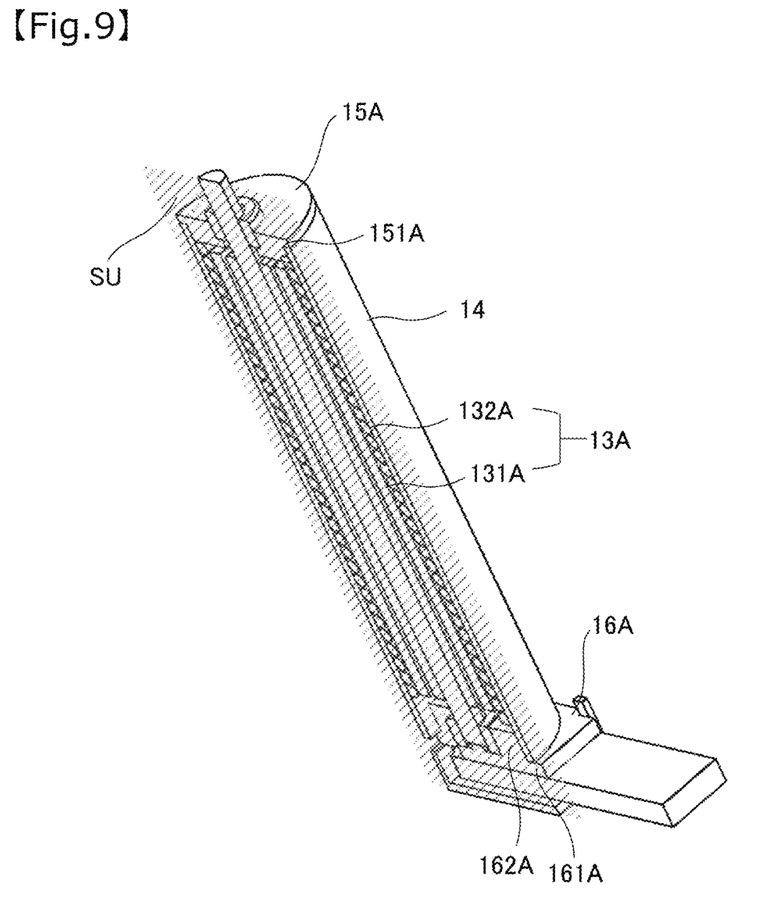
FIG. 9 is a view describing a first modification of the motor according to an example embodiment of the present disclosure.

FIG. 9 is a view for describing a first modification of the motor according to the example embodiment of the present disclosure. FIG. 9 is a sectional perspective view of a motor 100A according to the first modification. FIG. 9 is a longitudinal sectional view of the motor 100A taken along a plane including the central axis A. A plane SU indicated by hatching in FIG. 9 is a cross section. The motor 100A according to the first modification has substantially the same configuration as the motor 100 according to the above-described example embodiment. Hereinafter, different points will be described. In the following description of a second modification and a third modification as well, different points will be described.

The motor 100A according to the first modification further includes a case 14. The case 14 is arranged radially outward of a back yoke 132A and surrounds the back yoke 132A. The case 14 has a cylindrical shape extending in the axial direction. In the present modification, the case 14 has a cylindrical shape centered on the central axis A. An inner peripheral surface of the case 14 faces an outer peripheral surface of the back yoke 132A in the radial direction. With the configuration in which the motor 100A includes the case 14, a stator 13A including the back yoke 132A and an air-core coil 131A can be covered and protected.

Note that the case 14 is made of, for example, metal or resin. For example, when the case 14 is made of metal, the rigidity of the motor 100A can be enhanced. For example, when the case 14 is configured using an insulator, the leakage of the magnetic flux can be suppressed. Note that the inner peripheral surface of the case 14 may be fixed to the outer peripheral surface of the back yoke 132 using, for example, an adhesive.

The present modification is different from the above-described example embodiment in that an upper bush 15A and a lower bush 16A are attached to the case 14. The upper bush 15A is fitted into the case 14 from an upper portion of the cylindrical case 14. The upper bush 15A is fitted to a position where a bush flange portion 151A abuts against an upper end of the case 14. The lower bush 16A is attached to the case 14 by fitting a bush cylindrical portion 162A into the case 14 from the lower portion of the cylindrical case 14. The bush cylindrical portion 162A is fitted to a position where a bush bottom plate portion 161A abuts against a lower end of the case 14.

The upper bush 15A and the lower bush 16A are fixed to the case 14 using, for example, an adhesive. When the case 14 and the bushes 15A and 16A are made of resin, the case 14 and the bushes 15A and 16A may be fixed by deposition. When the case 14 and the bushes 15A and 16A are made of metal, the case 14 and the bushes 15A and 16A may be fixed by welding.

Figure 10:
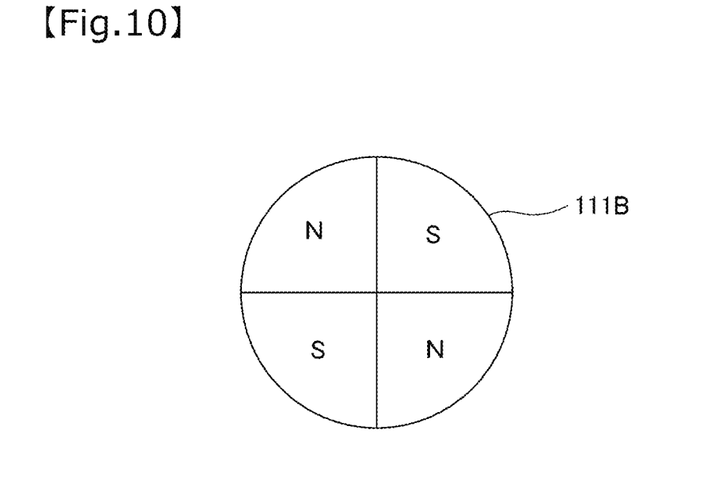
FIG. 10 is a view describing a second modification of the motor according to an example embodiment of the present disclosure.

FIG. 10 is a view for describing a second modification of the motor according to the example embodiment of the present disclosure. Specifically, FIG. 10 is a schematic view illustrating an example of a magnetization pattern of a shaft 111B included in the motor according to the second modification. FIG. 10 illustrates the magnetization pattern of a cross section of the shaft 111B taken along a plane orthogonal to the axial direction.

In the second modification, the shaft 111B has the magnetization pattern in which at least two or more poles of N and S poles are alternately arranged in a circumferential direction. That is, the shaft 111B also functions as a magnet. For this reason, a rotor included in the motor of the second modification does not include a magnet configured as a separate member from the shaft 111B. In the configuration of the modification, the shaft 111B and the air-core coil 131 (see FIG. 2) face each other at an interval in the radial direction.

When the shaft 111B has the function of the magnet as described above, a radial size of the motor can be reduced as compared with a configuration in which a shaft and a magnet are separate members. According to such a configuration, in a case of having the same size as a motor configured to include the shaft and the magnet as separate members, the shaft 111B can be thickened, and the rigidity of the shaft 111B can be improved. That is, according to such a configuration, even in a case where the size of the motor is small, the shaft 111B can be made less likely to be twisted, and the reliability of the motor can be improved. According to such a configuration, it is unnecessary to arrange the magnet separately from the shaft 111B, and thus, the number of parts can be reduced, and it is possible to improve the assemblability of the motor and to reduce the cost.

In the example illustrated in FIG. 10, the shaft 111B has the magnetization pattern in which four poles of N and S poles are arranged in the circumferential direction. However, the magnetization pattern is an example, and the number of poles arranged in the circumferential direction may be various numbers of poles such as two poles, six poles, and eight poles. The shaft 111B may be made of a material that can be magnetized. The shaft 111B may be made of, for example, a rare earth magnet such as a neodymium magnet containing neodymium, iron, or boron as a main component. The shaft 111B may be configured to be entirely magnetized. However, the shaft 111B may be configured to be partially magnetized. In the shaft 111B, at least a region radially facing the air-core coil 131 (see FIG. 2) extending in the axial direction is preferably magnetized.

Figure 11:
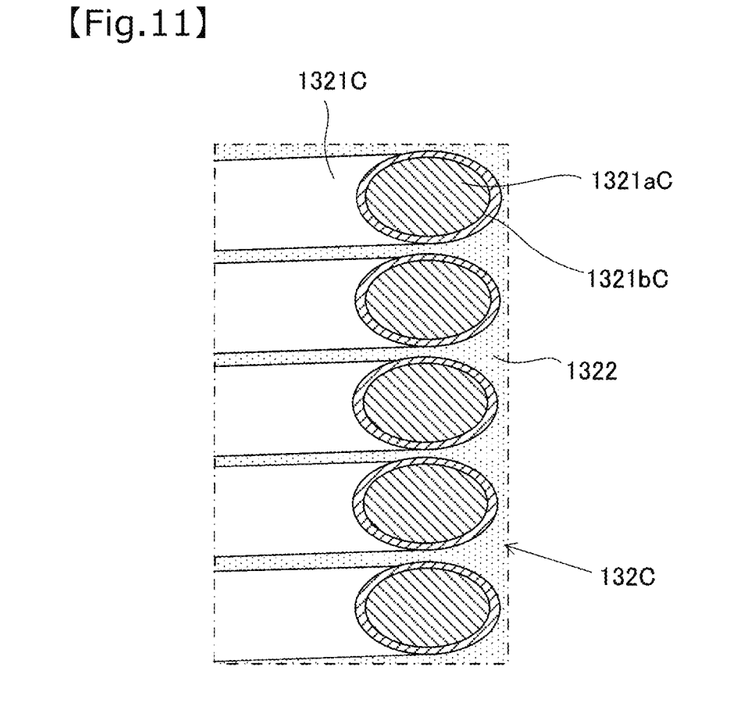
FIG. 11 is a view describing a third modification of the motor according to an example embodiment of the present disclosure.

FIG. 11 is a view for describing a third modification of the motor according to the example embodiment of the present disclosure. Specifically, FIG. 11 is a view in which a part of a back yoke 132C is cut out. As illustrated in FIG. 11, the motor according to the third modification includes an adhesive layer 1322 that covers at least a part of an insulating film layer 1321bC. According to a configuration of the present modification, it is possible to further improve the dielectric strength between linear portions 1321C forming the back yoke 132C formed in a coil shape.

The adhesive layer 1322 may be made of, for example, an acrylic or epoxy adhesive. The back yoke 132C may be formed, for example, by covering a metal wire 1321aC having in a coil shape with an insulator, such as polyurethane and polyester, and then solidifying the metal wire with an adhesive such as acrylic. In addition, the back yoke 132C may also be formed by providing a fusion layer such as polyimide on the coil-shaped metal wire 1321aC covered with the insulator, and thermally curing the metal wire.

Various technical features disclosed in the present description can be variously modified in a scope without departing from the gist of the technical creation. The plurality of example embodiments and modifications illustrated in the present description may be carried out in combination as far as possible.

The technology of the present disclosure can be widely used for motors used in, for example, home appliances, automobiles, ships, aircraft, trains, robots, and the like.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor including a shaft centered on a central axis extending vertically;
a bearing that supports the shaft;
an air-core coil that is radially outward of the rotor and extends in an axial direction;
a back yoke that has an axially extending shape with a linear portion having a coil shape, and includes an inner peripheral surface to which the air-core coil is fixed; and
an annular portion on an outside of the shaft in a radial direction and fixed to the shaft; wherein
the back yoke is sandwiched between an upper bush which holds an upper bearing and a lower bush which holds the bearing;
the upper bearing is on the outside of the shaft in the radial direction and supports an upper portion of the shaft; and
the annular portion is between the air-core coil and the upper bearing in the axial direction and overlaps the upper bearing in the axial direction.

2. The motor according to claim 1, wherein the shaft includes a magnetization pattern in which at least two or more N and S poles are alternately arranged in a circumferential direction.

3. The motor according to claim 1, wherein an upper end and a lower end of the air-core coil are between an upper end and a lower end of the back yoke in the axial direction.

4. The motor according to claim 1, wherein
the bearing is a lower bearing that is on an outside of the shaft in a radial direction and supports a lower portion of the shaft; and
the lower bush includes:
a bush bottom plate portion expanding in a direction orthogonal to the axial direction;
a bush cylindrical portion extending upward from the bush bottom plate portion and holding the lower bearing on an inside in the radial direction; and
a bush protruding portion protruding upward from the bush bottom plate portion and opposing a lower end of the shaft in the axial direction.

5. The motor according to claim 4, wherein
a distal end of the bush protruding portion is a spherical surface projecting upward.

6. The motor according to claim 4, wherein
the bush bottom plate portion includes at least one bush penetrating portion penetrating in the axial direction; and
a lead wire of the air-core coil passes through the bush penetrating portion and is connected to a circuit board below the lower bush.

7. The motor according to claim 6, wherein
the bush cylindrical portion includes at least one cutout portion extending from an upper end to a lower end in the axial direction; and
the cutout portion overlaps the bush penetrating portion in the axial direction.

8. The motor according to claim 4, wherein
an axial distance between the upper bearing and the annular portion is smaller than an axial distance between an upper end of the bush protruding portion and an upper end of the lower bearing.

9. The motor according to claim 1, wherein an axial magnetic center of the rotor is located axially above an axial magnetic center of a stator including the back yoke and the air-core coil.

10. A motor comprising:
a rotor including a shaft centered on a central axis extending vertically;
a bearing that supports the shaft;
an air-core coil that is radially outward of the rotor and extends in an axial direction;
a back yoke that has an axially extending shape with a linear portion having a coil shape, and includes an inner peripheral surface to which the air-core coil is fixed; and
an annular portion provided on an outside of the shaft in a radial direction and fixed to the shaft; wherein
the annular portion is located below an upper bush with a lower end located below a lower end of the bearing, the annular portion overlapping the upper bush in the axial direction;
the bearing is an upper bearing that is on the outside of the shaft in the radial direction and supports an upper portion of the shaft; and
the annular portion is between the air-core coil and the upper bearing in the axial direction and overlaps the upper bearing in the axial direction.

11. The motor according to claim 10, wherein the shaft includes a magnetization pattern in which at least two or more N and S poles are alternately arranged in a circumferential direction.

12. The motor according to claim 10, wherein an upper end and a lower end of the air-core coil are between an upper end and a lower end of the back yoke in the axial direction.

13. The motor according to claim 10, further comprising:
a lower bush that holds a lower bearing; wherein
the lower bearing is on an outside of the shaft in the radial direction and supports a lower portion of the shaft; and
the lower bush includes:
a bush bottom plate portion expanding in a direction orthogonal to the axial direction;
a bush cylindrical portion extending upward from the bush bottom plate portion and holding the lower bearing on an inside in the radial direction; and
a bush protruding portion protruding upward from the bush bottom plate portion and opposing a lower end of the shaft in the axial direction.

14. The motor according to claim 13, wherein
a distal end of the bush protruding portion is a spherical surface projecting upward.

15. The motor according to claim 13, wherein
the bush bottom plate portion includes at least one bush penetrating portion penetrating in the axial direction; and
a lead wire of the air-core coil passes through the bush penetrating portion and is connected to a circuit board below the lower bush.

16. The motor according to claim 15, wherein
the bush cylindrical portion includes at least one cutout portion extending from an upper end to a lower end in the axial direction; and
the cutout portion overlaps the bush penetrating portion in the axial direction.

17. The motor according to claim 13, wherein
an axial distance between the upper bearing and the annular portion is smaller than an axial distance between an upper end of the bush protruding portion and an upper end of the lower bearing.

18. The motor according to claim 10, wherein an axial magnetic center of the rotor is located axially above an axial magnetic center of a stator including the back yoke and the air-core coil.

\* \* \* \* \*